US011962727B2

(12) United States Patent
Sheng (10) Patent No.: US 11,962,727 B2
(45) Date of Patent: Apr. 16, 2024

(54) MULTI-FUNCTION PRINTER WITH DETACHABLE SCANNER BODY CAPABLE OF DIRECTLY STARTING VERTICAL SCANNING OF A SHEET AND PRINTING UPON DETECTION OF SHEET MEDIUM

(71) Applicant: AVISION INC., Hsinchu (TW)

(72) Inventor: Shao-Lan Sheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 18/188,953

(22) Filed: Mar. 23, 2023

(65) Prior Publication Data

US 2023/0231958 A1 Jul. 20, 2023

Related U.S. Application Data

(63) Continuation-in-part of application No. 17/398,664, filed on Aug. 10, 2021, now abandoned.

(51) Int. Cl.
*H04N 1/00* (2006.01)
*H04N 1/04* (2006.01)

(52) U.S. Cl.
CPC ..... *H04N 1/00541* (2013.01); *H04N 1/00241* (2013.01); *H04N 1/00689* (2013.01); *H04N 1/00822* (2013.01)

(58) Field of Classification Search
CPC ........... H04N 1/00241; H04N 1/00541; H04N 1/00689; H04N 1/00822
USPC ....................................... 358/1.11–1.18, 505
See application file for complete search history.

(56) References Cited

U.S. PATENT DOCUMENTS

| 5,412,490 | A | 5/1995 | Kojima et al. |
| 5,889,597 | A | 3/1999 | Ara et al. |
| 6,069,711 | A * | 5/2000 | Iwata ................. H04N 1/00538 358/496 |
| 8,199,373 | B2 | 6/2012 | Ito |
| 2012/0126476 | A1* | 5/2012 | Sheng ............... H04N 1/00615 271/121 |
| 2017/0195510 | A1* | 7/2017 | Li ........................ H04N 1/0464 |
| 2017/0195512 | A1* | 7/2017 | Yamaguchi ............ G06V 40/10 |

(Continued)

FOREIGN PATENT DOCUMENTS

| CN | 1695955 A | 11/2005 |
| CN | 1848903 A | 10/2006 |

(Continued)

OTHER PUBLICATIONS

Li Zhishu et al.; "Information Processing," Chapter 2: Computers and Computer Systems, Section 2.5, p. 22, third paragraph from the bottom; Sichuan Science and Technology Press; Chengdu; 1988, with English statement of relevance.

*Primary Examiner* — Chad Dickerson
(74) *Attorney, Agent, or Firm* — Muncy, Geissler, Olds & Lowe, P.C.

(57) ABSTRACT

A multi-function printer includes a printer body and a scanner body. A printer module is disposed in the printer body. At least one first scanning module, at least one feeding roller and a sensor are disposed in the scanner body. The feeding roller and the sensor are disposed at an inlet of a sheet passage. When the sensor senses presence of a sheet medium, the first scanning module immediately performs image scanning on the sheet medium to obtain image data, and then the printer module prints out the image data.

20 Claims, 5 Drawing Sheets

(56) References Cited

U.S. PATENT DOCUMENTS

| | | |
|---|---|---|
| 2017/0374215 A1 | 12/2017 | Sheng et al. |
| 2019/0075209 A1 | 3/2019 | Sheng et al. |
| 2020/0084328 A1 | 3/2020 | Sheng |
| 2020/0169642 A1 | 5/2020 | Chen et al. |
| 2020/0314269 A1 | 10/2020 | Harada |
| 2020/0324991 A1* | 10/2020 | Nakamura ............... B65H 3/06 |

FOREIGN PATENT DOCUMENTS

| | | | | |
|---|---|---|---|---|
| CN | 1941826 A | | 4/2007 | |
| CN | 102059861 A | | 5/2011 | |
| CN | 107241523 A | * | 10/2017 | ......... H04N 1/00474 |
| CN | 107241523 A | | 10/2017 | |
| CN | 107404596 A | | 11/2017 | |
| CN | 107707785 A | | 2/2018 | |
| JP | 2004338234 A | * | 12/2004 | |
| JP | 2004338234 A | | 12/2004 | |
| JP | 2007185962 A | * | 7/2007 | ......... G03G 15/6508 |
| JP | 2007185962 A | | 7/2007 | |
| JP | 2008225707 A | | 9/2008 | |
| TW | 202010650 A | | 3/2020 | |

* cited by examiner

MULTI-FUNCTION PRINTER WITH DETACHABLE SCANNER BODY CAPABLE OF DIRECTLY STARTING VERTICAL SCANNING OF A SHEET AND PRINTING UPON DETECTION OF SHEET MEDIUM

CROSS-REFERENCE TO RELATED APPLICATIONS

This application is a continuation-in-part application of U.S. patent application Ser. No. 17/398,664, filed on Aug. 10, 2021, which is now abandoned and claims priority of No. 109130560 filed in Taiwan R.O.C. on Sep. 7, 2020 under 35 USC 119, the entire content of which is hereby incorporated by reference.

BACKGROUND OF THE INVENTION

Field of the Invention

This disclosure relates a multi-function printer, and more particularly to a multi-function printer directly enabling or starting a copy mechanism.

Description of the Related Art

A conventional multi-function printer has a scanner body, which is typically disposed above a printer module and usually covers the entire printer body, and is a so-called flatbed scanner. Such the conventional multi-function printer has the too-high cost and the relatively high selling price, and has the complicated steps in use. In operation, one page image of the document is scanned after an upper cover is placed on the page. When the next page image needs to be scanned, the upper cover needs to be opened, then the document is turned over, then the upper cover is closed, and then the scan button is pressed.

If the consumer selects a printer (a peripheral without image scanning function) according to the cost consideration, then an additional computer or mobile phone is required to transmit the image to the printer because no scanner can be provided to capture the image of the sheet medium. More particularly, a wireless network or wired apparatus is required to perform the copy operation, and this is very inconvenient.

Thus, how to provide a printer having a simple copy function to be conveniently used by an ordinary consumer is a problem to be solved by this disclosure.

BRIEF SUMMARY OF THE INVENTION

An objective of this disclosure is to provide a multi-function printer, wherein when a sensor senses presence of a sheet medium, a first scanning module immediately performs image scanning on the sheet medium to obtain image data, and then a printer module prints out the image data so that the above-mentioned problem can be solved.

To achieve the above-identified object, this disclosure provides a multi-function printer including a printer body and a scanner body. A printer module is disposed in the printer body. At least one first scanning module, at least one feeding roller and a sensor are disposed in the scanner body. A nip between the first scanning module and the feeding roller is formed in the sheet passage. The feeding roller and the sensor are disposed at an inlet of a sheet passage. When the sensor senses presence of a sheet medium not yet reaching the nip, the feeding roller is immediately rotated to generate vibrations and air streams to move and guide the sheet medium through the nip, and vertical sheet-fed image scanning is immediately performed, by the first scanning module, on the sheet medium to obtain image data representative of the sheet medium, and then the printer module prints out the image data.

The scanner body of the multi-function printer of this disclosure is disposed on one side of the multi-function printer to provide the slim and light properties and decrease the visual space pressure. In addition, because the sheet passage is disposed adjacent to only the first scanning module, the feeding roller and the sensor, the paper-jam possibility upon the image scanning operation can be minimized.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
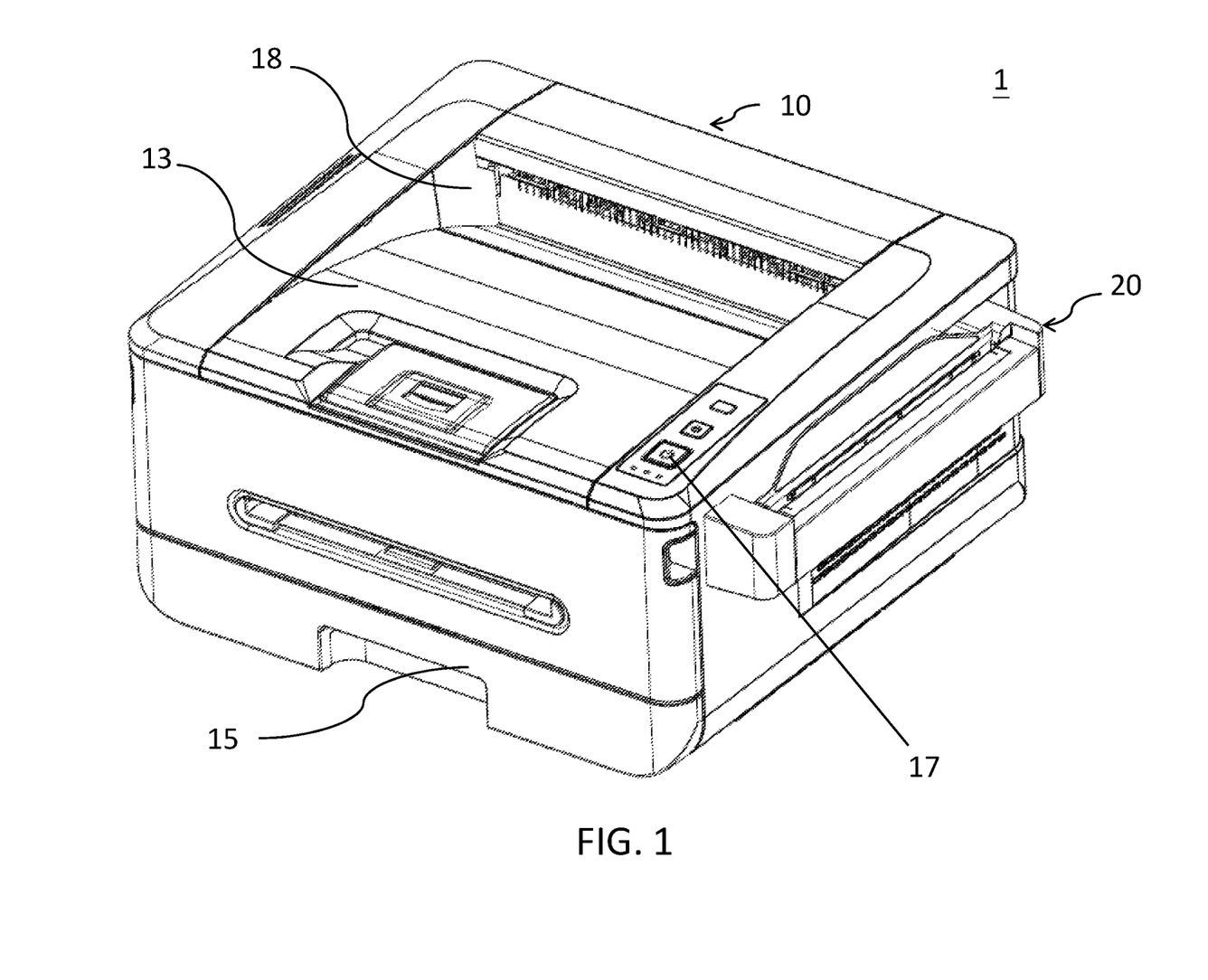
FIG. 1 is a pictorial view showing a multi-function printer of this disclosure.
Figure 2:
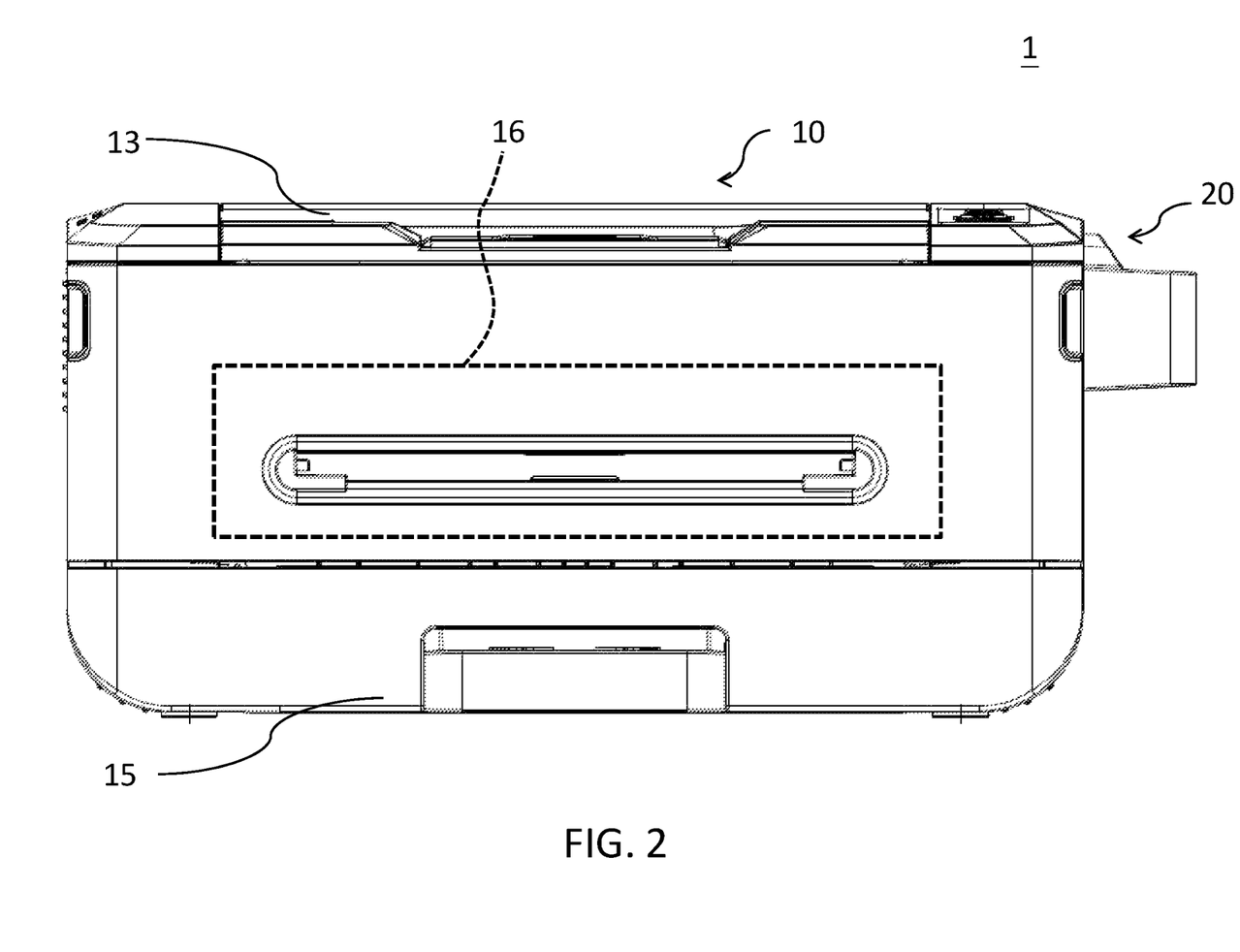
FIG. 2 is a front view showing the multi-function printer of this disclosure.
Figure 3:
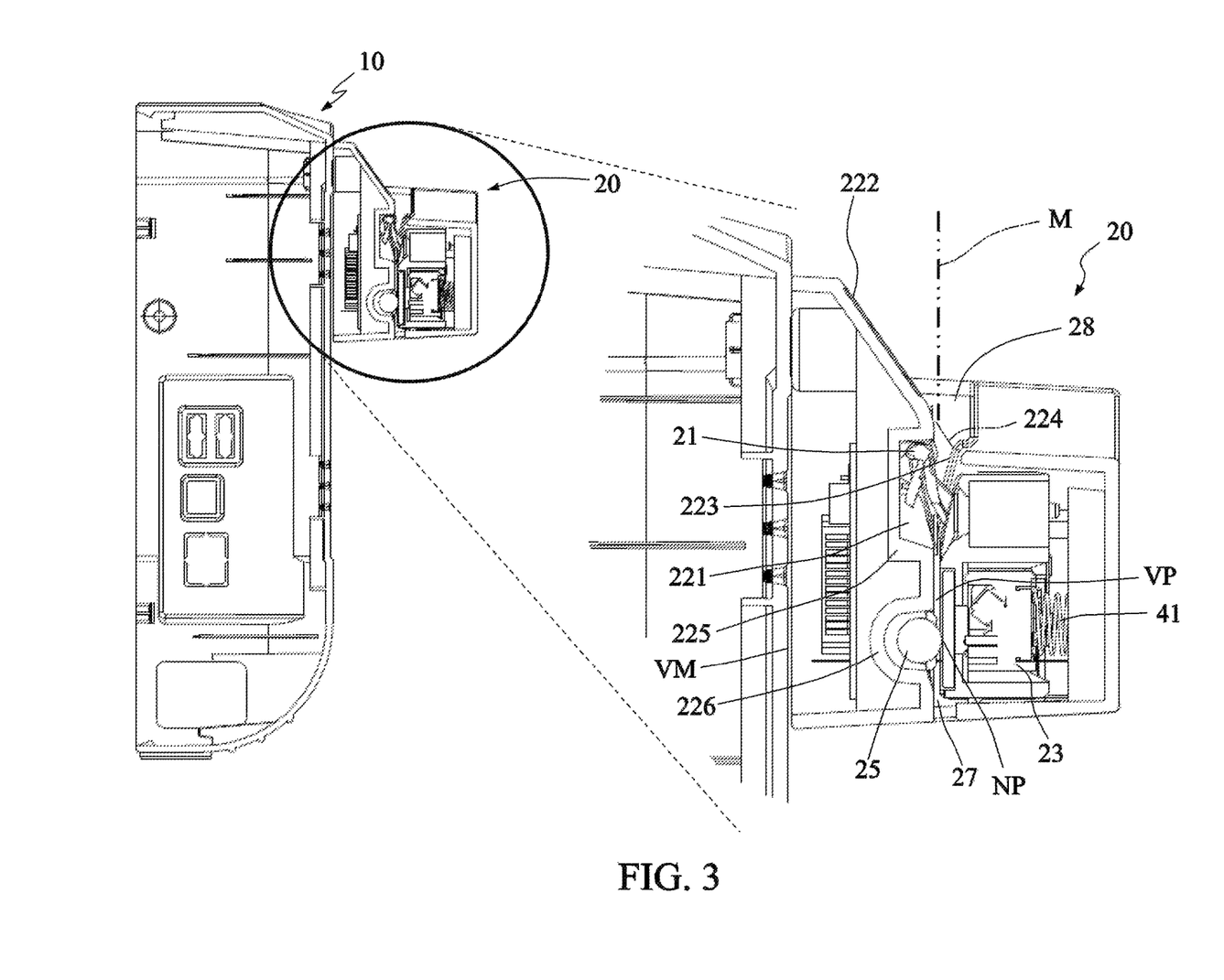
FIG. 3 is a cross-sectional view showing a first embodiment of the invention.

FIG. 1 is a pictorial view showing a multi-function printer of this disclosure. FIG. 2 is a front view showing the multi-function printer of this disclosure. FIG. 3 is a cross-sectional view showing the first embodiment of the invention. Referring to FIGS. 1 to 3, this disclosure provides a multi-function printer 1 including a printer body 10 and a scanner body 20. A printer module 16 is disposed in the printer body 10. At least one first scanning module 23, a feeding roller 25 and a sensor 21 are disposed in the scanner body 20. The feeding roller 25 and the sensor 21 are disposed at an inlet 28 of a sheet passage 27. A nip NP between the first scanning module 23 and the feeding roller 25 is formed or present in the sheet passage 27. When the sensor 21 senses presence of a sheet medium M not yet reaching the nip, the feeding roller 25 is immediately rotated to generate vibrations and air streams to move and guide the sheet medium M to travel a vertical distance along a vertical path VP, which is substantially parallel to a vertical mounting surface VM between the printer body 10 and the scanner body 20, in the sheet passage 27 and then through the nip NP, and the first scanning module 23 cooperates with the feeding roller 25 to immediately perform vertical sheet-fed image scanning on the sheet medium M to obtain image data representative of the sheet medium M, and then the printer module 16 prints out the image data. Thus, the user can let go the sheet medium M as soon as the sheet medium M is sensed by the sensor 21 in the state when the sheet medium M is not pressed by the user to reach the nip NP. The rotating feeding roller 25 can generate the vibrations in conjunction with a spring 41 of the first scanning module 23. In one example, a processor (not shown) of the multi-function printer 1 receives a signal of the sensor 21 sensing the presence of the sheet medium M, and then directly enables the first scanning module 23 to perform image acquiring.

Figure 4:
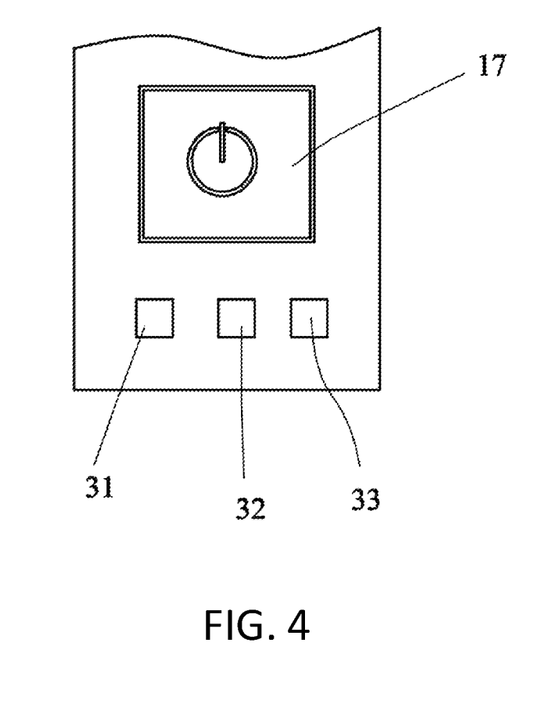
FIG. 4 is a schematic plane view showing the operation assembly of FIG. 1 working in conjunction with three indicators.

Because the multi-function printer 1 of this disclosure has the printer body 10 serving as a main body, the complete required functions including the copy function can be satisfied. In the multi-function printer 1 of this disclosure, the printer body 10 further includes an operation assembly 17 for setting various parameters or use modes. It is worth noting that the operation assembly 17 is for setting the parameters or use modes of the side-mounted scanner body 20. The parameters may include the copy count, hue intensity and resolution, while the use modes may include the simplex copy mode, duplex copy mode or multi-page copy mode. In one example, as shown in FIG. 4, the user can operate the operation assembly 17 to set the simplex print mode, duplex print mode and scan-to-computer mode, so that a simplex printing indicator 31, a duplex printing indicator 32 and a scan-to-computer indicator 33 of the multi-function printer 1 disposed on the printer body 10 may output indicating lights to the user, wherein the use modes which can be set by the operation assembly comprise a simplex copy mode, a duplex copy mode and a scan-to-computer mode respectively corresponding to the indicating lights outputted by the simplex printing indicator 31, the duplex printing indicator 32 and the scan-to-computer indicator 33. In the scan-to-computer mode, the first scanning module 23 scans an image representative of the sheet medium M to obtain image data and the multi-function printer 1 transmits the image data to an external device, such as a computer, a mobile phone or a server, connected to the multi-function printer 1. This provides a simple physical indicating manner, and is different from the displayed icons on the conventional touch screen. In this embodiment, the scanner body 20 has: an inclined surface 222 extending downwardly rightward and being adjacent to the inlet 28 of the sheet passage 27; and a first cavity frame 225, which is connected to the inclined surface 222, and extends, in order, substantially horizontally leftward, substantially vertically downward and substantially horizontally rightward to form a cavity 221, which is formed under the inclined surface 222, communicates with the sheet passage 27, is connected with the inlet 28 and accommodates the sensor 21. Thus, the sensor 21 is disposed in the cavity 221, which is formed under the inclined surface 222 and connected with the inlet 28, so that the space in the scanner body 20 can be saved.

In this embodiment, the scanner body 20 may further have a second cavity frame 226, which is disposed under and connected to the first cavity frame 225 and accommodates the feeding roller 25, so that the space in the scanner body 20 can be further saved. Also, the scanner body 20 may further have a second inclined surface 223 being disposed opposite the inclined surface 222 and extending downwardly leftward, and an extension 224 of the inclined surface 222 intersects the second inclined surface 223, so that the sheet medium M can be placed on the inclined surface 222, slide downwardly rightward and then be guided by the second inclined surface 223 to facilitate the user in placing the sheet medium M. The sensor 21 is directed across from the second inclined surface 223. In this embodiment, the sheet passage 27 is a vertical passage so that a weight of the sheet medium M assists the sheet medium M in passing through the nip NP. In one example the sensor 21 is a contact-type sensor. In another example, the sensor may be a non-contact-type sensor including an emitter and a receiver to increase the sensitivity, and the light emitted by the sensor 21 may be reflected away from the sensor 21 by the second inclined surface 223 when no sheet medium M is present between the sensor 21 and the second inclined surface 223 to prevent any noise, reflected by a vertical surface or another surface of the scanner body 20, from being received by the sensor 21.

It is to be noted that the multi-function printer 1 of this disclosure is a multi-function printer having the operation assembly 17 without any execution button, wherein the execution button may include, for example, a start button or copy button. Because the printer body 10 of this disclosure serves as the main body mounted with the additional apparatus having the scan function, the user intuitively needs the copy function when the user uses the scanner body 20 to scan the sheet medium. So, when the sensor 21 senses presence of a sheet medium, the process of the copy function (scan and print) is triggered by the sensing signal of the sensor 21 and is not triggered by the start button or copy button. In one example, the multi-function printer 1 has no start button, no copy button and/or no display, such as LED display or OLED display, for displaying information, so that cost of the multi-function printer 1 can be decreased.

Furthermore, because the printer is a peripheral product for the computer, and the user would not simply use the printer, and an external document source provider or image source provider is required. The print parameters are set from the source provider, and then the execution button on the source provider is pressed to perform the printing. The source provider usually means the computer, mobile phone or server. In this disclosure, in order to enhance the flexibility of using the printer without confusing the user's habit and way of using the printer, no modification is made to the discharge tray and operation interface of the printer satisfying the user's habit. Instead, the simple scan member (scanner body) is mounted to one side of the printer, and provides a vertical sheet-fed scan mode, so that the top-view surface area of the scanner body is significantly smaller than the top-view surface area of the printer. The same properties are applied to the front view, wherein the front-view surface area of the scanner body is also significantly smaller than the front-view surface area of the printer body. Therefore, the user's product perception of the original use of the printer (document or image printing) is not affected, and the convenience of flexible print adjustment in use can be obtained because the image or document printing can be achieved without the computer.

If the operation assembly 17 of the multi-function printer 1 of this disclosure has a touch panel (not shown) or an ordinary display panel (not shown), then the touch panel or ordinary display panel also functions for inputting or setting of various parameters or use modes, but has no execution button or icon, which is to be pressed after various parameters or use modes have been inputted or set. That is, no start icon or copy icon for starting a copy operation is configured on the touch screen. The copy function is executed mainly according to the trigger instruction generated when the sensor 21 of the scanner body 20 senses presence of the sheet medium.

In the multi-function printer 1 of this disclosure, the scanner body 20 is disposed on one side of the printer body 10, and the width of the side of the multi-function printer 1 is slightly greater than the width of the scanner body 20, wherein the side may be the front, rear, left or right sidewall of the multi-function printer 1.

A discharge tray 13 of the printer body 10 is an upper member of the multi-function printer 1 of this disclosure. This configuration can provide the maximum spatial availability (no discharge tray projecting beyond the body needs to be provided), and further facilitate the user in taking out the printed and copied sheet medium. A print supply tray 15 of the multi-function printer 1 of this disclosure is disposed under the printer body 10, and this is convenient to the configuration of one or multiple print supply trays under the print supply tray 15 according to various user requirements.

The multi-function printer 1 of this disclosure is designed from the spatial availability of the slim and light product, and is further adapted to a desktop printer, which is a printer applicable to the sheet medium of the A4 or LETTER size according to the current market specification. The side-mounted scanner body 20 may have a scan discharge tray according to the requirement, and may also have no discharge tray because the sheet medium being scanned can directly fall on the desktop, so that the user needs not to worry about the condition that the sheet medium falls on the floor and gets dirty. When the multi-function printer 1 of this disclosure is disposed on a table or a cabinet, it can function as a desktop multi-function printer at the preferred level without exceeding one meter, so that the technical design enables the user to see the copied result when the user sits on the chair. In one example, when the multi-function printer 1 is disposed on the table or cabinet, the total height or level of the multi-function printer 1 from the floor, which supports the table or cabinet, does not exceed one meter. In one example, the height of the table or cabinet ranges from 70 cm to 80 cm. So, the total height of the multi-function printer 1 from the table or cabinet does not exceed 20 cm or 30 cm. In another example, when the scanner body 20 is detached from the printer body 10 and the printer module 16 is disconnected from the first scanning module 23 and the sensor 21 by the user, the operation assembly 17 automatically switches to the printer mode, in which the simplex printing indicator 31, the duplex printing indicator 32 and the scan-to-computer indicator 33 are automatically disabled from outputting the indicating lights to the user, and the multi-function printer 1 is ready for receiving print data from the external device connected thereto. When the scanner body 20 is attached to the printer body 10 and the printer module 16 is electrically connected to the first scanning module 23 and the sensor 21 by the user through connectors, such as USB connectors, the operation assembly 17 automatically switches to the copy mode, in which one, two or all of the simplex printing indicator 31, the duplex printing indicator 32 and the scan-to-computer indicator 33 are automatically enabled to output the indicating lights to the user.

In a second embodiment, this disclosure further provides a multi-function printer having a scanner body 20, which is a duplex document scanning device having the first scanning module 23 and a second scanning module (not shown but may be clearly understood according to a second scanning module 24 in the following FIG. 5) disposed opposite the first scanning module 23 on two sides of the sheet passage 27, two sets of the feeding rollers 25 (input and output rollers) and at least one sensor 21, wherein the first scanning module 23, the second scanning module, the two sets of the feeding rollers 25 (input and output rollers) and the at least one sensor 21 are closely disposed to possibly shorten the travelling distance of the sheet medium in the sheet passage, thereby minimizing the paper jam risk. The two scanning modules scan two sides of the sheet medium M to obtain duplex image data. The more detailed explanations will be provided in the following. The two sets of the feeding rollers 25 (input and output rollers) in the sheet passage 27 are respectively disposed on two sides of the first scanning module 23 and the second scanning module at positions very close to the first scanning module 23 and the second scanning module disposed on two sides of the sheet passage 27, so that the neighboring positional configurations are provided. Such the technical design makes the multi-function printer of this disclosure small and cute, and the user clearly sees the sheet inlet (inlet 28, see FIG. 3) of the scanner body 20 and a sheet outlet 18 (see FIG. 1) of the printer body 10 from the top at a glance.

Figure 5:
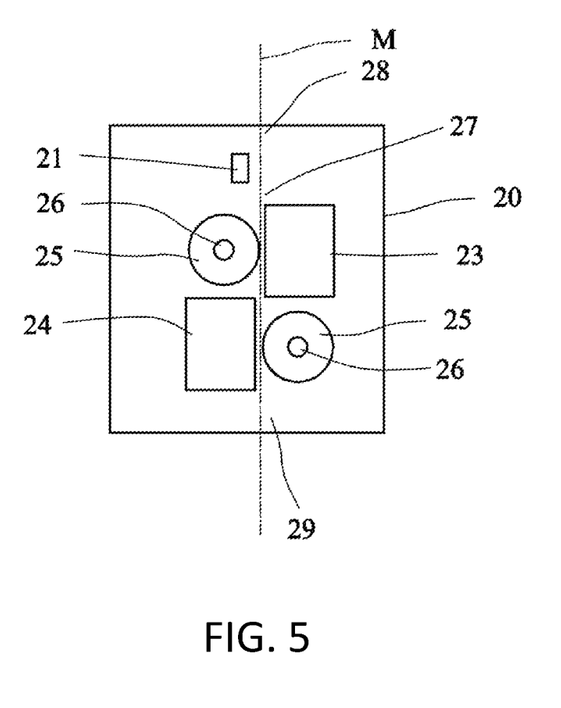
FIG. 5 is a schematic view showing a modified scanner body.

FIG. 5 is a schematic side view showing a modified scanner body 20, which may also be applied to the first and second embodiments. Referring to FIG. 5, this disclosure further provides the scanner body 20, which is a duplex document scanning device having the first scanning module 23 and the second scanning module 24 disposed opposite the first scanning module 23 (the scanning modules 23 and 24 are disposed on two sides of the sheet passage 27), feeding rollers 25 and at least one sensor 21, which are closely disposed to possibly shorten the travelling distance of the sheet medium in the sheet passage, thereby minimizing the paper jam risk. In this example, there is only one shaft 26 mounted with one feeding roller 25 or multiple feeding rollers, wherein the feeding roller cooperates with the first scanning module 23 to feed the sheet medium M, and this configuration may also be clearly seen in FIG. 3. Therefore, the user may place the sheet medium M into the inlet 28, and the sheet medium M falls down into the sheet passage 27 and reaches the nip between the feeding roller 25 and the first scanning module 23. The feeding roller 25 starts to feed the sheet medium M downwards and then the first scanning module 23 performs image scanning. Then, the second scanning module 24 cooperates with the lower feeding roller 25 to perform image scanning. Thus, no feeding roller set and no other sheet sensor need to be disposed at the sheet inlet 28 or a sheet outlet 29 of the sheet passage 27, and the cost can be decreased. It is noted that when only one scanning module is disposed in the scanner body, the further advantage is further provided. In addition, the lower feeding roller 25 may also be replaced by a pressing element.

This disclosure enables the user to obtain the copy function extended from the printer, and the user only needs to use one single button to set the desired use mode (simplex copy/multi-page copy), and then place the sheet medium into the sheet inlet on one side to complete the desired work. The user needs not to understand the setting and operation details of the conventional peripheral. This is an important stage of the new technology design of printers.

The multi-function printer 1 of this disclosure has the technical design mainly based on the printer body 10, the top view area of the printer body 10 is larger than that of the scanner body 20, and the user can clearly identify the additional usage of the side-mounted scanner body 20. The user only needs to place the sheet medium into the scanner body 20, and the feeding roller 25 can be triggered to rotate when the sensor 21 senses the presence of the sheet medium. Then, the first scanning module 23 acquires the image. If the second scanning module is provided, then the second scanning module is also triggered to acquire another image, so that the images can be transmitted to the printer body 10 and printed out.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A multi-function printer, comprising:
   a printer body, in which a printer module is disposed; and
   a scanner body, in which at least one first scanning module, a feeding roller and a sheet detection sensor are disposed, wherein the sheet detection sensor is disposed outside the first scanning module and at an inlet of a vertical sheet passage, and a nip between the first scanning module and the feeding roller is formed in the vertical sheet passage;
   wherein when the sheet detection sensor senses, in the vertical sheet passage, presence of a sheet medium not yet reaching the nip, the feeding roller is immediately rotated to generate vibrations and air streams to move and guide the sheet medium to travel a vertical distance along a vertical path, which is substantially parallel to a vertical mounting surface between the printer body and the scanner body, in the vertical sheet passage and then through the nip, and vertical sheet-fed image scanning is immediately performed, by the first scanning module, on the sheet medium to obtain image data representative of the sheet medium, and then the printer module prints out the image data,
   wherein the scanner body has: an inclined surface extending downwardly rightward and being adjacent to the inlet of the vertical sheet passage; and a first cavity frame, which is connected to the inclined surface, and extends, in order, substantially horizontally leftward, substantially vertically downward and substantially horizontally rightward to form a cavity, which is formed under the inclined surface, communicates with the vertical sheet passage, is connected with the inlet and accommodates the sheet detection sensor.

2. The multi-function printer according to claim 1, wherein the printer body further comprises an operation assembly for setting different parameters or use modes.

3. The multi-function printer according to claim 2, wherein the use modes which can be set by the operation assembly comprise a simplex copy mode and a duplex copy mode.

4. The multi-function printer according to claim 3, wherein the multi-function printer has no start button and no copy button.

5. The multi-function printer according to claim 3, wherein the multi-function printer has no start button, no copy button and no display.

6. The multi-function printer according to claim 2, further comprising a simplex printing indicator and a duplex printing indicator outputting indicating lights to a user, wherein the use modes which can be set by the operation assembly comprise a simplex copy mode and a duplex copy mode respectively corresponding to the indicating lights outputted by the simplex printing indicator and the duplex printing indicator.

7. The multi-function printer according to claim 6, wherein:
   when the scanner body is detached from the printer body and the printer module is disconnected from the first scanning module and the sheet detection sensor by the user, the operation assembly automatically switches to a printer mode, in which the simplex printing indicator and the duplex printing indicator are automatically disabled from outputting the indicating lights to the user, and the multi-function printer is ready for receiving print data from an external device; and
   when the scanner body is attached to the printer body and the printer module is electrically connected to the first scanning module and the sheet detection sensor by the user, the operation assembly automatically switches to a copy mode, in which one or two of the simplex printing indicator and the duplex printing indicator are automatically enabled to output the indicating lights to the user.

8. The multi-function printer according to claim 6, further comprising a scan-to-computer indicator, wherein the use modes further comprise a scan-to-computer mode, in which the first scanning module scans an image representative of the sheet medium to obtain the image data and the multi-function printer transmits the image data to an external device connected to the multi-function printer.

9. The multi-function printer according to claim 1, wherein the scanner body is disposed on one side of the printer body, and a width of the one side of the printer body of the multi-function printer is slightly greater than a width of the scanner body.

10. The multi-function printer according to claim 1, wherein a print supply tray is disposed under the printer body, and a discharge tray is disposed above the printer body.

11. The multi-function printer according to claim 1, wherein the multi-function printer is adapted to be placed on a table or a cabinet so that a total level of the multi-function printer from a floor, which supports the table or cabinet, does not exceed one meter.

12. The multi-function printer according to claim 1, wherein a weight of the sheet medium assists the sheet medium in passing through the nip.

13. The multi-function printer according to claim 1, wherein when the sheet detection sensor senses the presence of the sheet medium, the first scanning module is directly enabled to perform image acquiring without being triggered by a start button or a copy button.

14. The multi-function printer according to claim 1, wherein when the sheet detection sensor senses the presence of the sheet medium, the first scanning module is directly enabled to perform image acquiring to start a copy operation without being triggered by a start icon or a copy icon disposed on a touch screen.

15. The multi-function printer according to claim 1, further comprising a second scanning module disposed opposite the first scanning module.

16. The multi-function printer according to claim 1, wherein the feeding roller is rotated to generate the vibrations in conjunction with a spring of the first scanning module.

17. The multi-function printer according to claim 1, wherein the sheet detection sensor is directed across from a second inclined surface being disposed opposite the inclined surface.

18. The multi-function printer according to claim 17, wherein the scanner body further has a second cavity frame, which is disposed under and connected to the first cavity frame and accommodates the feeding roller.

19. The multi-function printer according to claim 17, wherein the scanner body further has the second inclined surface extending downwardly leftward, and an extension of the inclined surface intersects the second inclined surface, wherein the inclined surface and the second inclined surface are disposed at the inlet of the vertical sheet passage so that the sheet medium can be placed on the inclined surface, slide downwardly rightward and then be guided by the second inclined surface to facilitate a user in placing the sheet medium.

20. The multi-function printer according to claim 17, wherein the scanner body further has: the second inclined surface extending downwardly leftward, wherein the sheet detection sensor is directed across from the second inclined surface being disposed opposite the inclined surface, the inclined surface and the second inclined surface are disposed at the inlet of the vertical sheet passage, and light emitted by the sheet detection sensor is reflected away from the sheet detection sensor by the second inclined surface when the sheet medium is not present between the sheet detection sensor and the second inclined surface to prevent noise, reflected by the scanner body, from being received by the sheet detection sensor.

\* \* \* \* \*